(12) United States Patent
Abdelghaffar et al.

(10) Patent No.: US 12,438,668 B2
(45) Date of Patent: Oct. 7, 2025

(54) SOUNDING REFERENCE SIGNAL (SRS) TIME BUNDLING FOR PARTIAL FREQUENCY SOUNDING

(71) Applicant: QUALCOMM Incorporated, San Diego, CA (US)

(72) Inventors: Muhammad Sayed Khairy Abdelghaffar, San Jose, CA (US); Alexandros Manolakos, Escondido, CA (US); Tingfang Ji, San Diego, CA (US); Runxin Wang, San Diego, CA (US); Pinar Sen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 427 days.

(21) Appl. No.: 18/001,708

(22) PCT Filed: Jul. 16, 2021

(86) PCT No.: PCT/US2021/042099
§ 371 (c)(1),
(2) Date: Dec. 13, 2022

(87) PCT Pub. No.: WO2022/046316
PCT Pub. Date: Mar. 3, 2022

(65) Prior Publication Data
US 2023/0231682 A1 Jul. 20, 2023

(30) Foreign Application Priority Data
Aug. 24, 2020 (GR) .............................. 20200100506

(51) Int. Cl.
*H04L 5/00* (2006.01)
(52) U.S. Cl.
CPC .......... *H04L 5/0051* (2013.01); *H04L 5/0094* (2013.01)

(58) Field of Classification Search
CPC ........................... H04L 5/0051; H04L 5/0094
See application file for complete search history.

(56) References Cited

U.S. PATENT DOCUMENTS

| 2015/0063095 A1* | 3/2015 | Deng | H04W 8/005 370/221 |
| 2016/0128029 A1* | 5/2016 | Yang | H04W 48/16 370/329 |

(Continued)

OTHER PUBLICATIONS

Huawei, et al., "Enhancements on SRS for Rel-17", R1-2005247, 3GPP TSG RAN WG1 Meeting #102-e, Aug. 28, 2020 (Aug. 28, 2020), 9 Pages, XP051917295, Retrieved from the Internet: URL: https://ftp.3gpp.org/tsg_ran/WG1_RL1/TSGR1_102-e/Docs/R1-2005247.zip. [Retrieved on Aug. 8, 2020], Sections 4.1 and 4.3, figures 9,10, sections 4-5.
International Search Report and Written Opinion—PCT/US2021/042099—ISA/EPO—Oct. 22, 2021.

(Continued)

*Primary Examiner* — Stephen J Clawson
(74) *Attorney, Agent, or Firm* — ArentFox Schiff, LLP and Qualcomm, Incorporated

(57) ABSTRACT

Aspects for time bundling an SRS resource over a plurality of instances are disclosed. The apparatus may include a user equipment (UE). The user equipment may receive a configuration from a base station for time-bundling at least one sounding reference signal (SRS) resource. The time-bundling may be performed by the UE transmitting a plurality of SRS signals at different times using an identical center frequency and at least two different frequency resource allocations. The UE may transmit the plurality of SRS signals based on the configuration.

30 Claims, 12 Drawing Sheets

(56) References Cited

U.S. PATENT DOCUMENTS

| | | | |
|---|---|---|---|
| 2017/0033908 A1* | 2/2017 | Hwang | H04L 5/0051 |
| 2018/0013533 A1* | 1/2018 | Yang | H04L 1/1887 |
| 2018/0270792 A1* | 9/2018 | Park | H04W 68/025 |
| 2018/0287757 A1* | 10/2018 | Onggosanusi | H04L 5/0092 |
| 2019/0174466 A1* | 6/2019 | Zhang | H04L 5/0057 |
| 2019/0215781 A1* | 7/2019 | Jeon | H04W 52/365 |
| 2019/0356445 A1* | 11/2019 | Manolakos | H04B 7/0805 |
| 2020/0162133 A1* | 5/2020 | Harrison | H04W 52/08 |
| 2020/0336986 A1* | 10/2020 | Chen | H04W 52/46 |
| 2021/0367727 A1* | 11/2021 | Go | H04L 5/0048 |
| 2022/0045884 A1* | 2/2022 | Lin | H04L 5/0098 |
| 2022/0103324 A1* | 3/2022 | Ly | H04L 5/0048 |
| 2022/0303087 A1* | 9/2022 | Sun | H04L 5/0053 |
| 2023/0231682 A1* | 7/2023 | Abdelghaffar | H04L 5/0051 |
| | | | 370/330 |

OTHER PUBLICATIONS

Lenovo, et al., "Discussion of Additional SRS Symbols", 3GPP Draft, 3GPP TSG RAN WG1 Meeting #98, R1-1908719, Discussion of Additional SRS Symbols Final, 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 17, 2019 (Aug. 17, 2019), pp. 1-8, XP051765327, Section 2.4.

Qualcomm Incorporated: "Enhancements on SRS Flexibility, Switching, Coverage and Capacity", 3GPP TSG-RAN WG1 Meeting #102-e, R1-2006795, 3rd Generation Partnership Project, Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020, XP051918245, 27 Pages, Section 2, Sections 2.1.2, 2.1.1, 2 .1.3, Sections 2.1.3 and 4.2.2, Sect. 2. 2.1 Sect. 2.2.2, paragraph [4.2.8].

\* cited by examiner

SOUNDING REFERENCE SIGNAL (SRS) TIME BUNDLING FOR PARTIAL FREQUENCY SOUNDING

CROSS-REFERENCE TO RELATED APPLICATION

This application is a National Phase entry of PCT Application No. PCT/US2021/042099, entitled "SOUNDING REFERENCE SIGNAL (SRS) TIME BUNDLING FOR PARTIAL FREQUENCY SOUNDING" and filed on Jul. 16, 2021, which claims priority to Greek application No. 20200100506, entitled "SOUNDING REFERENCE SIGNAL (SRS) TIME BUNDLING FOR PARTIAL FREQUENCY SOUNDING" and filed on Aug. 24, 2020, both of which are expressly incorporated by reference herein in their entirety.

BACKGROUND

Technical Field

The present disclosure relates generally to communication systems, and more particularly, to the transmission of reference signals in a wireless network.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Sounding Reference Signals (SRSs) may be transmitted at specified intervals or on demand by the user equipment (UE) in order for the network to perform channel estimation for uplink scheduling and timing purposes. The SRS is a reference signal sent by the UE that contains information about channel quality. The SRS may be used by the network to make channel and timing estimations for uplink scheduling of UE data transmissions, for example.

Time bundling of the SRS signal, or partitioning by the network of an SRS resource into a plurality of transmissions by the UE over different frequencies and time slots (in lieu of a single repetitive SRS transmission), can be used to provide the network with superior channel state information (CSI), to increase the signal-to-noise ratio (SNR) of the uplink transmissions, and to effectively increase overall cell coverage than would otherwise be possible without the use of time-bundling. However, a number of factors may adversely affect the ability of manufacturers to reliably or effectively use SRS time bundling in the context of modern high speed/capacity networks, the latter of which can often have very precise timing and bandwidth requirements and can transmit high-speed information under already tenuous channel conditions. As one of several examples, conventional proposals have failed to adequately address the role of phase coherence in SRS time bundling to ensure that the base station can coherently combine the phases of the collective transmissions to accurately reproduce the SRS resource at the network and to thereby competently assess channel quality.

Accordingly, techniques are proposed herein to enable a UE to perform accurate time-bundling of an SRS resource by transmitting a plurality of SRS signals using different bandwidth allocations while maintaining an identical center frequency. Configuring the network such that the UE maintains an identical center frequency of the SRS transmissions, in concert with other features disclosed herein, enables the network to maintain phase coherence of the received signals, thereby preserving the higher SNR and larger coverage area that can ultimately be achieved. Various configurations described herein provide additional time and frequency-domain dependent factors and constraints that can further ensure the robustness, reliability, and accuracy of SRS time bundling. For example, transmit power considerations, UE-specific limitations, and as well, attributes unique to the 5G-NR implementations (e.g., bandwidth part requirements) are disclosed herein. In an aspect of the disclosure, a method, a computer-readable medium, and an apparatus are provided.

A method of wireless communication at a user equipment (UE) is disclosed. The method includes receiving a configuration from a base station for time-bundling a sounding reference signal (SRS) resource by transmitting a plurality of SRS signals at different times using an identical center frequency and at least two different frequency resource allocations. The UE transmits the plurality of SRS signals based on the configuration.

A method of wireless communication at a base station is also disclosed. The base station receives information about a user equipment (UE) during a UE capability or radio resource control (RRC) connection. The base station provides to the UE, during the RRC connection based on the information, a configuration to time bundle a sounding reference signal (SRS) resource by transmitting a plurality of SRS signals at different times using an identical center frequency and at least two different frequency resource allocations.

A user equipment (UE) is further disclosed. The user equipment (UE) includes a memory. The UE also includes at least one processor coupled to the memory. The at least one processor is configured to receive a configuration from a base station for time-bundling a sounding reference signal (SRS) resource by transmitting a plurality of SRS signals at different times using an identical center frequency and at least two different frequency resource allocations. The UE transmits the plurality of SRS signals based on the configuration.

A user equipment (UE) in accordance with another aspect is disclosed. The UE includes means for receiving a configuration from a base station for time-bundling a sounding reference signal (SRS) resource by transmitting a plurality of SRS signals at different times using an identical center frequency and at least two different frequency resource allocations. The UE also includes means for transmitting the plurality of SRS signals based on the configuration.

A base station is also disclosed. The base station includes a memory and at least one processor. The at least one processor is coupled to the memory and operable to receive information about a user equipment (UE) during a UE capability or radio resource control (RRC) connection. The base station is further operable to provide to the UE, during the RRC connection based on the information, a configuration to time bundle a sounding reference signal (SRS) resource by transmitting a plurality of SRS signals at different times using an identical center frequency and at least two different frequency resource allocations.

A base station in another aspect is disclosed. The base station includes means for receiving information about a user equipment (UE) during a UE capability or radio resource control (RRC) connection. The base station also includes means for providing to the UE, during the RRC connection based on the information, a configuration to time bundle a sounding reference signal (SRS) resource by transmitting a plurality of SRS signals using an identical center frequency and at least two different frequency resource allocations at different respective times.

A non-transitory computer readable medium for storing code is disclosed. The code, when executed by at least one processor, causes the at least one processor to receive a configuration from a base station for time-bundling a sounding reference signal (SRS) resource by transmitting a plurality of SRS signals at different times using an identical center frequency and at least two different frequency resource allocations, and to transmit the plurality of SRS signals based on the configuration.

A non-transitory computer readable medium in accordance with another aspect is disclosed. The computer readable medium stores code that, when executed on at least one processor, causes the at least one processor to receive information about a user equipment (UE) during a UE capability or radio resource control (RRC) connection. The code causes the at least one processor to provide to the UE, during the RRC connection based on the information, a configuration to time bundle a sounding reference signal (SRS) resource by transmitting a plurality of SRS signals at different times using an identical center frequency and at least two different frequency resource allocations.

Time bundling can also occur in any of the above implementations between a plurality of SRS transmissions based on a (1) single SRS resource or (2) a plurality of SRS resources. Accordingly, each of the above implementations are deemed to include this configuration. Additionally, in another aspect, a method for wireless communication at a user equipment (UE) includes receiving a configuration from a base station for time-bundling one or more sounding reference signal (SRS) resources by transmitting a plurality of SRS signals at different times using an identical center frequency and at least two different frequency resource allocations, and transmitting the plurality of SRS signals based on the configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
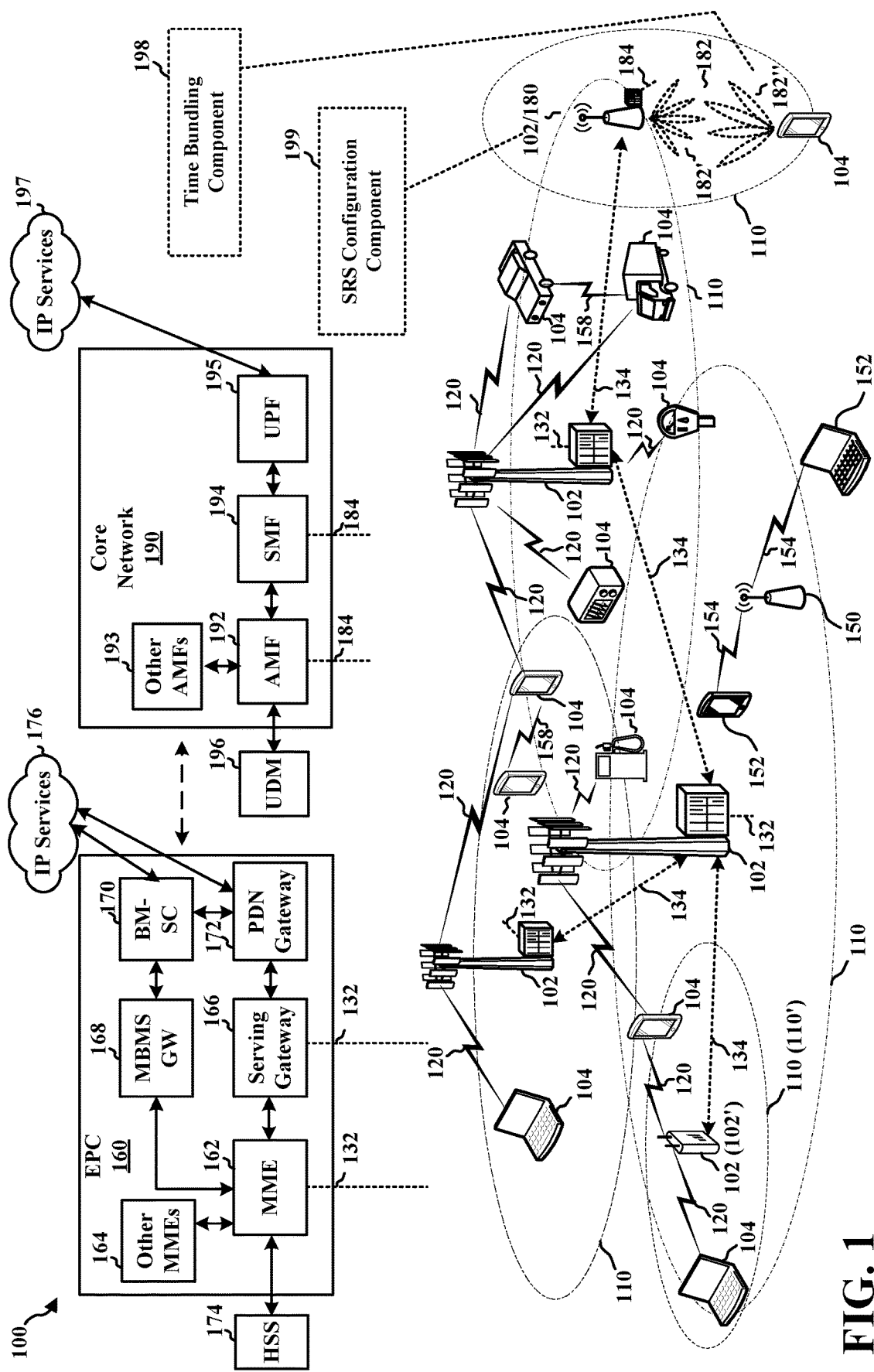
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may include an SRS configuration component 199 that is configured to receive information about a UE's capabilities during an RRC signaling session or a UE-capability signaling session, or during another network exchange. The base station 180 may use this information to develop an SRS time-bundling configuration for the UE 104 that communicated the information. The configuration may include both time domain and frequency domain constraints or requirements for time bundling. Using the component 199, the base station can provide this information to the UE 104 during the RRC signaling session, or otherwise, such that in a subsequent radio exchange of data signals, the UE 104 can transmit time-bundled SRS signals in a manner specified by the configuration that was developed based on information from the UE with which the base station 180 was in communication.

UE 104 may include a time bundling component 198 that is configured to receive the configuration information from the component 199 at the base station 180 and to use this information to transmit a plurality of time-bundled SRS signals. Component 198 may use information from both the time domain and the frequency domain to transmit the SRS signals and to produce the SRS transmissions to include different frequency resource allocations specified by the base-station and an identical center frequency along all transmissions to enable the base station 180 to maintain phase coherence of the SRS signal.

Although the following description may be focused on the time bundling of a particular SRS reference signal, the concepts described herein may be applicable to other similar areas, such as other types of reference signals that may be transmitted by the UE, base station or another component. Further, although the following description may be focused on 5G NR, the concepts described herein may be applicable to other similar areas, such as LTE, LTE-A, CDMA, GSM, and other wireless technologies that use similar types of reference signals and for which time bundling pursuant to the principles herein is suitable.

Figure 2B:
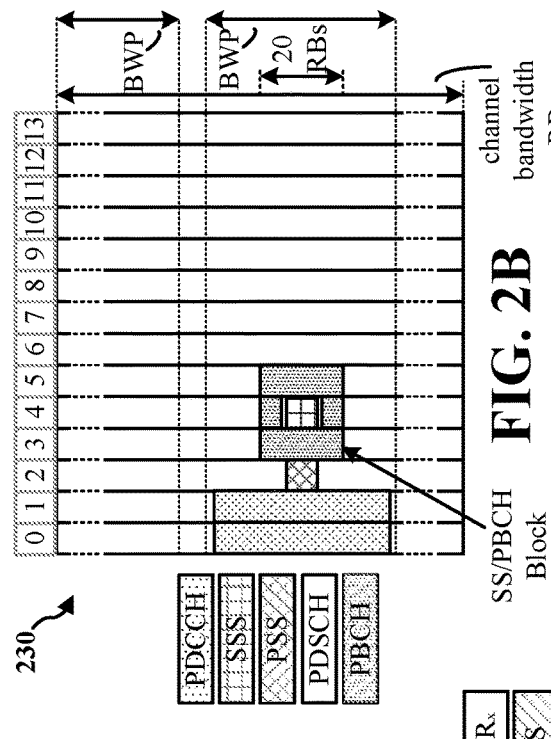
FIG. 2B is a diagram illustrating an example of DL channels within a subframe, in accordance with various aspects of the present disclosure.
Figure 2D:
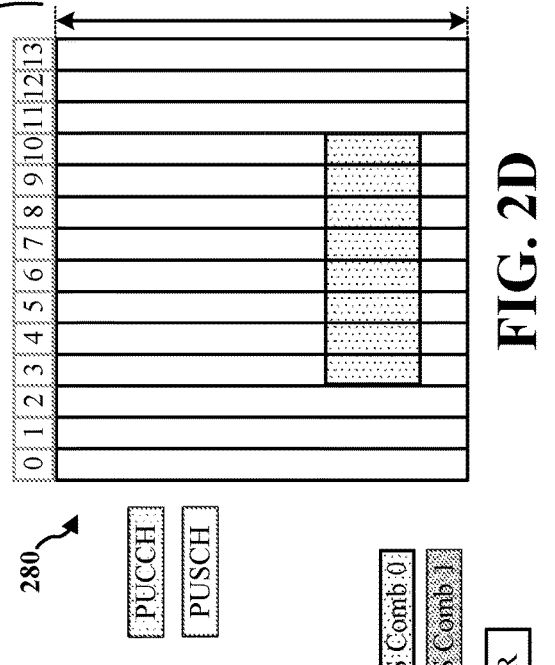
FIG. 2D is a diagram illustrating an example of UL channels within a subframe, in accordance with various aspects of the present disclosure.
Figure 2A:
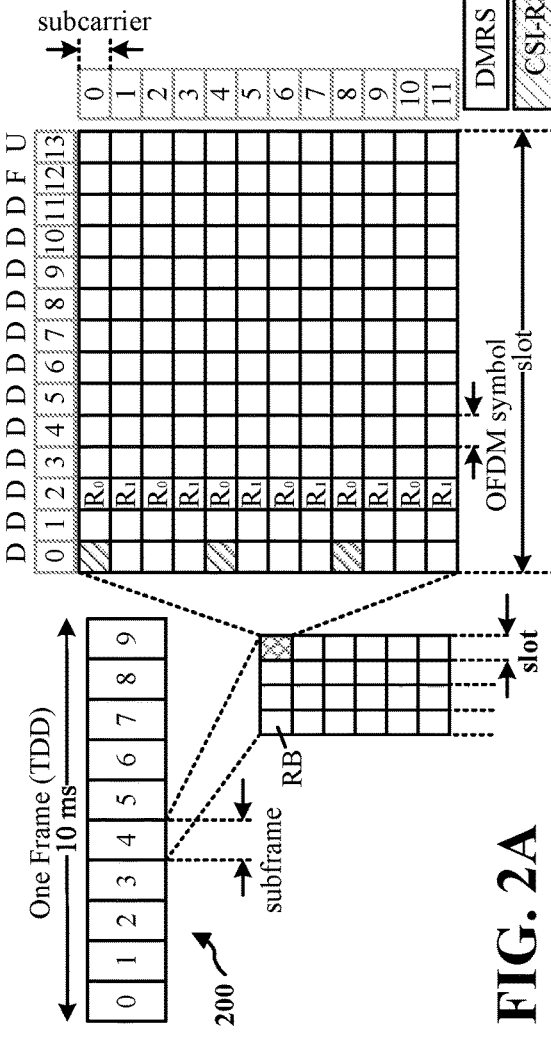
FIG. 2A is a diagram illustrating an example of a first frame, in accordance with various aspects of the present disclosure.
Figure 2C:
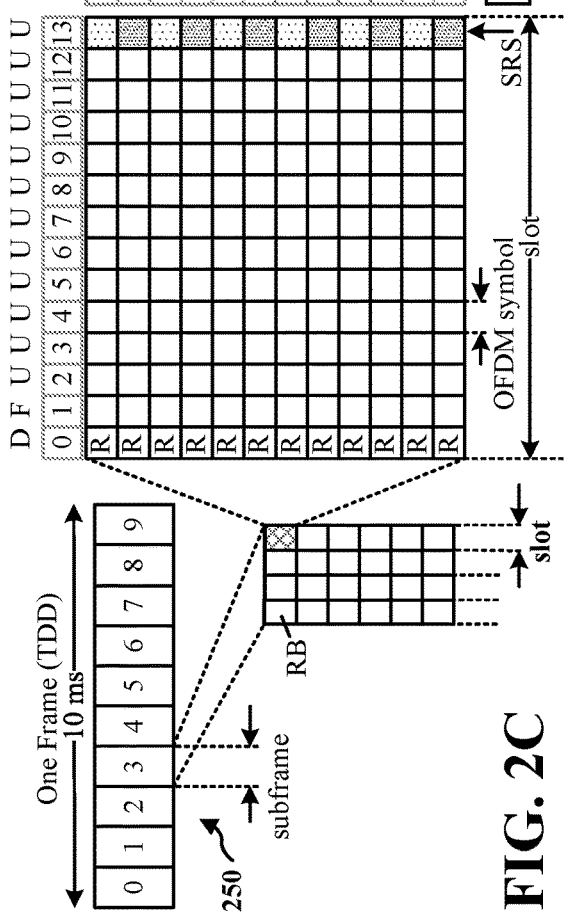
FIG. 2C is a diagram illustrating an example of a second frame, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu 0$ to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (see FIG. 2B) that are frequency division multiplexed. Each bandwidth part may have a particular numerology. The use by the UE of bandwidth parts in the context of SRS transmissions is described in more detail below.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
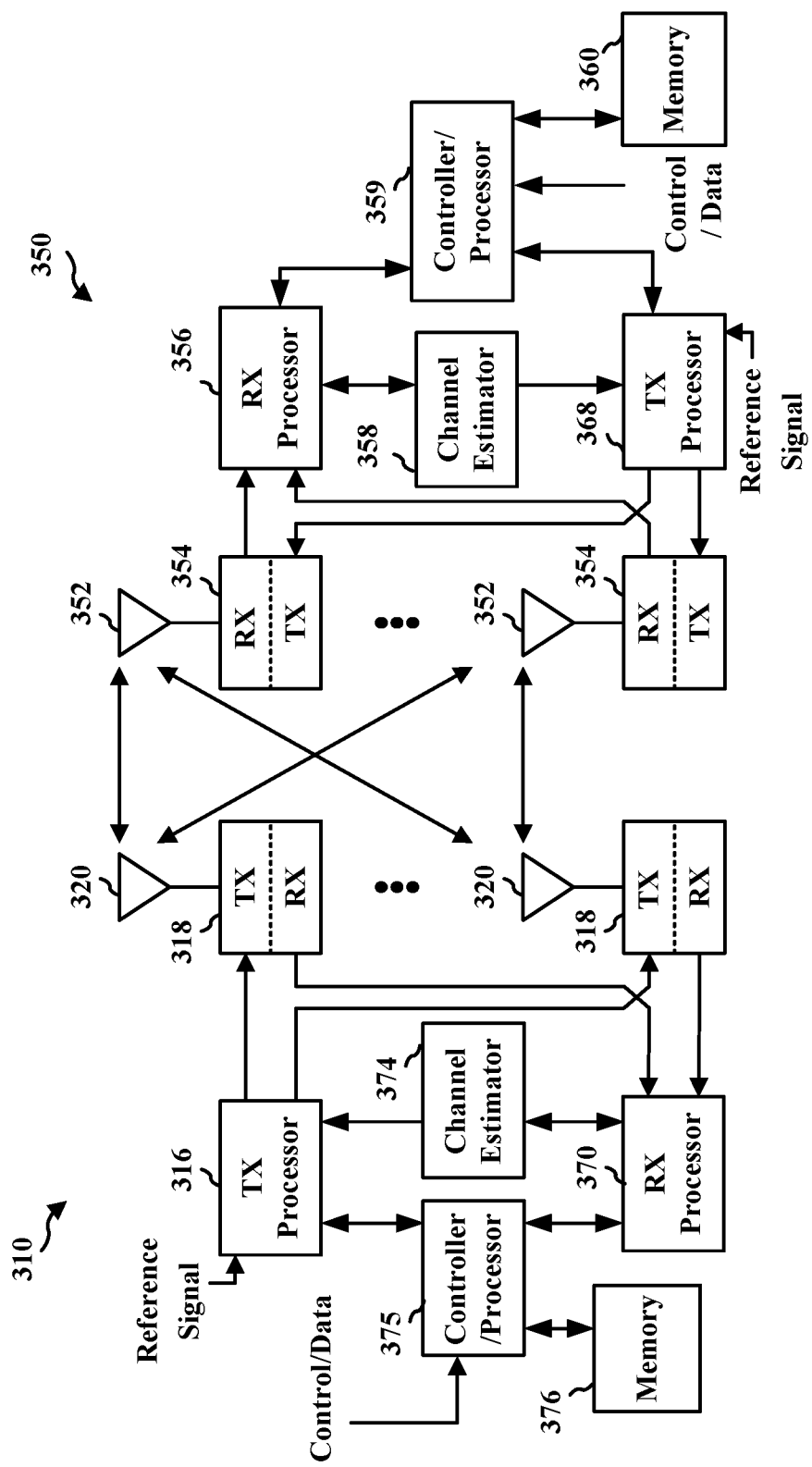
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. Further, at least one of the TX processor 316, the RX processor 370, and the controller/processor 375 may be configured to perform aspects in connection with 198 of FIG. 1.

The SRS are physical signals transmitted at the end of an uplink to enable the base station to estimate the channel state information (CSI) over different frequencies. The CSI, in turn, helps the base station to correctly allocate resources to the UE. Thus, the SRS may be used by the base station to estimate the uplink channel quality from a particular UE. The base station may use this information for uplink frequency selective scheduling for the UE. In addition, the base station may also use SRS signals to extract uplink timing information, such as in cases where few or no PUSCH or PUCCH transmission occur in a given time period. The SRS can be time and frequency multiplexed. For example, the SRS can occupy different OFDM symbols in the last symbol of a subframe. Various sounding signals particular to a UE may be independently used in transmitting SRS signals. SRS signals can in some implementations be frequency-hopped In general, three types of SRS transmissions have been defined in existing standards for LTE. These are single SRS transmissions, periodic SRS transmissions and aperiodic SRS transmissions. Each of these types of signals are configured through RRC signaling. Thus, for each of the types of SRS transmissions, various parameters are first configured using RRC, including which of the three formats will be used in upcoming data exchanges. Aperiodic SRS transmissions, however, are triggered by downlink control information (DCI) sent from the base station on the physical downlink control channel. More specifically, aperiodic SRS transmissions are triggered by an "SRS request" flag.

5G NR has also introduced the concepts of "bandwidth parts" which is relevant to portions of the disclosure below. Bandwidth parts provide flexibility for users with different bandwidth capabilities. Bandwidth parts enable multiplexing of different signals onto an identical bandwidth part. For example, a carrier can be subdivided and used for different purposes. Each subdivision can be classified into its own bandwidth part. An overall carrier may include component carrier sets with a first bandwidth part, for example, inside of which may reside a signal that is encompassed by the first bandwidth part and forms a second bandwidth part. In short, a carrier bandwidth part may be defined as a contiguous set of physical resource blocks, selected from a contiguous subset of the common resource blocks for a given numerology on a given carrier.

Given the recent efforts to promulgate the new 5G NR specification, STS transmissions have become increasingly important as a potentially effective mechanism for advanced channel estimation and timing techniques. The advancements in both base stations and UEs, such as the increased use of MIMO antenna configurations, extensions of the standard to the unlicensed spectra, and the need to make existing protocols more productive while being efficient, to name a few, have been proposed with the principle goal of improving not only network speed, but overall network coverage. Increased coverage naturally increase network performance. Because SRS is used as a principal channel estimator for UEs, this desired network coverage depends on the reliability and robustness of SRS in achieving its objectives. However, significant obstacles are being addressed and questions are being raised as to how to optimally implement SRS transmissions, both in general and in the face of the new standard with its superior channel and bandwidth requirements.

One such question that has been raised is how best to enhance SRS techniques to target the different frequency ranges that 5G is using. The 5G NR carrier bandwidth now includes frequency range 1 (FR1: 450 MHz to 6 GHz) and frequency range 2 (FR2: 24.25 GHz to 52.6 GHz). Accordingly, practitioners may face new challenges in identifying workable protocols for enhancing and extending SRS to FR1 and FR2.

Other questions have been raised over identifying and specifying enhancements to the NR standard for aperiodic SRS triggering and to facilitate more flexible triggering. Increasing the effectiveness of such techniques, if successful, may also reduce DCI overhead and usage reduction. On another front, proponents of 5G NR also face the task of specifying SRS switching techniques for deployment with up to eight (8) antennas that may be used with the xTyR protocol (where y=the number of antennas and x=the number of ports, and y can now be 8). Thus directional antenna techniques are being used even at the UE. The conventional use of repetitive SRS has not to date been deemed conducive to maximizing efficiency for these more advanced beamforming and spatial multiplexing techniques.

Yet another objective that has yet to be achieved is how to enhance SRS capacity or coverage in itself through techniques including time bundling, increased SRS repetition, and partial frequency sounding, for example. Time bundling involves partitioning an SRS resource for a UE into two or more time slots for matching with different resources. The base station may "bundle" its single SRS reception instance across multiple instances to increase signal-to-noise ratio (SNR), and therefore network coverage, for the transmitting UE in question.

Time-bundling is also affected by transmit power. For example, the UE has a limited amount of power. If the UE transmits an SRS across a wide frequency band, the transmitted power will be smaller than if the UE transmits using the same power level but across a narrower frequency band. In the latter case, the power spectral density is higher. The network can use SRS bundling to combine this information coherently (e.g., by adding the magnitude and phase of the SRS signals) to achieve a greater SNR. However, to date, the use of SNR depends on a number of factors, and the present disclosure addresses a need for a proposed time bundling implementation that provides for coherent combinations to maximize the SNR of the UE, and thus to increase the radius of coverage.

Figure 4:
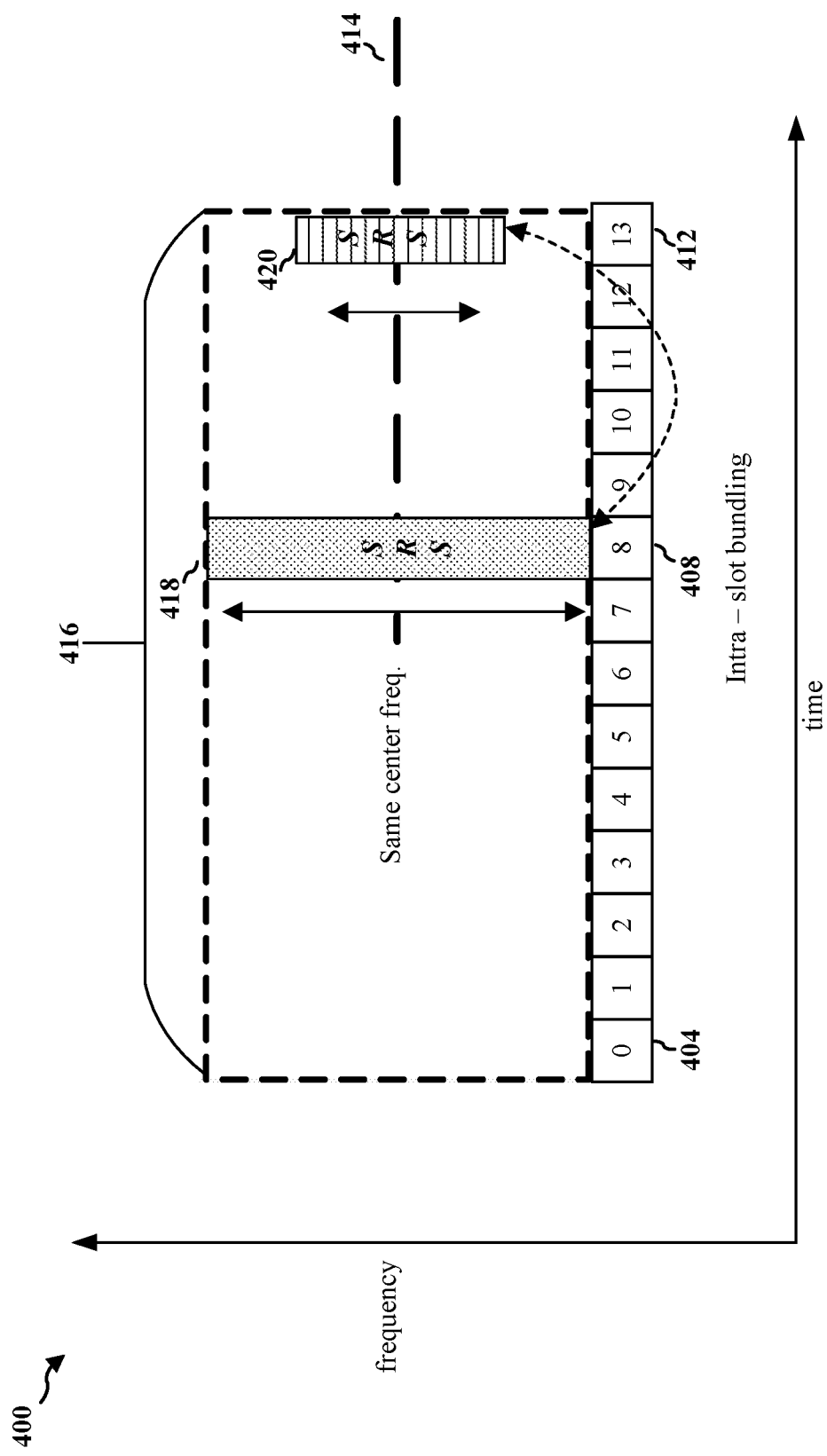
FIG. 4 is a frequency versus time diagram of an intra-slot bundled SRS resource allocated across two frequency resources.

FIG. 4 is a frequency versus time diagram 400 of a plurality of intra-slot bundled SRS resource allocated across two frequency resources 408 and 412. FIG. 4 shows a slot similar to the slot shown in FIG. 2A, with 14 total symbols beginning at symbol 0 (404) and ending at symbol 13 (412), with the associated resource blocks in the slot 416. In FIGS. 4-8, for example, the UE shown may be the UE 104 in FIG. 1 or the UE 310 in FIG. 3, or the UEs shown in subsequent illustrations and as described in other portions of the specification. The base station may be the base station/gNB 102/180 in FIG. 1 or the base station 310 in FIG. 3, and may be referred to herein as a gNB, for example. The base station may also be the base station as described in subsequent illustrations (e.g., FIG. 12) and related text. As noted previously, the horizontal portion of the graph represents time, with the vertical portion representing the frequency of the component carriers. According to an aspect of the disclosure, an SRS resource is time-bundled over two symbols in an intra-slot format. Initially, during an RRC signaling session with the UE at issue and the base station (e.g., a gNB), the UE may transmit information to the gNB about its capabilities and configuration. In turn, the base station may prepare an SRS time-bundling configuration for the UE in which a UE resource is allocated and partitioned using different times and frequencies within a single slot 416. The configuration is transmitted to the UE. In the example shown, the SRS transmission occurs over slot 416 but instead of a repetitive SRS transmission where a single pulse is sent over all frequencies (or a frequency-hopped signal is sent), the SRS resource is partitioned into a wideband SRS transmission 418 at slot 8 (408) and a partial-sounding or narrowband transmission 420 at slot 13 (412).

Ordinarily, if an arbitrary set of frequencies is chosen at slot 13, the gNB may recover the signals; however the gNB could not coherently combine them to enhance the SNR of the UE data transmissions. Accordingly, in one aspect of the disclosure, the partitioned signals 418 and 420 are transmitted over an identical center frequency 414. Accordingly, even though the signal is transmitted at different frequencies, the common center frequency enables the gNB to coherently combine the transmissions and thereby take advantage of the increased coverage. It should be noted that in this case, while two signals have been transmitted, in other cases the SRS resource may be further portioned into three or more SRS transmissions. Provided the center frequency is maintained as identical and the coherence window of the UE is not exceeded, the gNB can coherently combine all of the SRS transmissions to perform channel estimation with a higher SNR. While this case shows a single UE, the gNB can separately configure other UEs with similar time-bundled resources to perform other coherent combinations, increasing network coverage as a whole.

Figure 5:
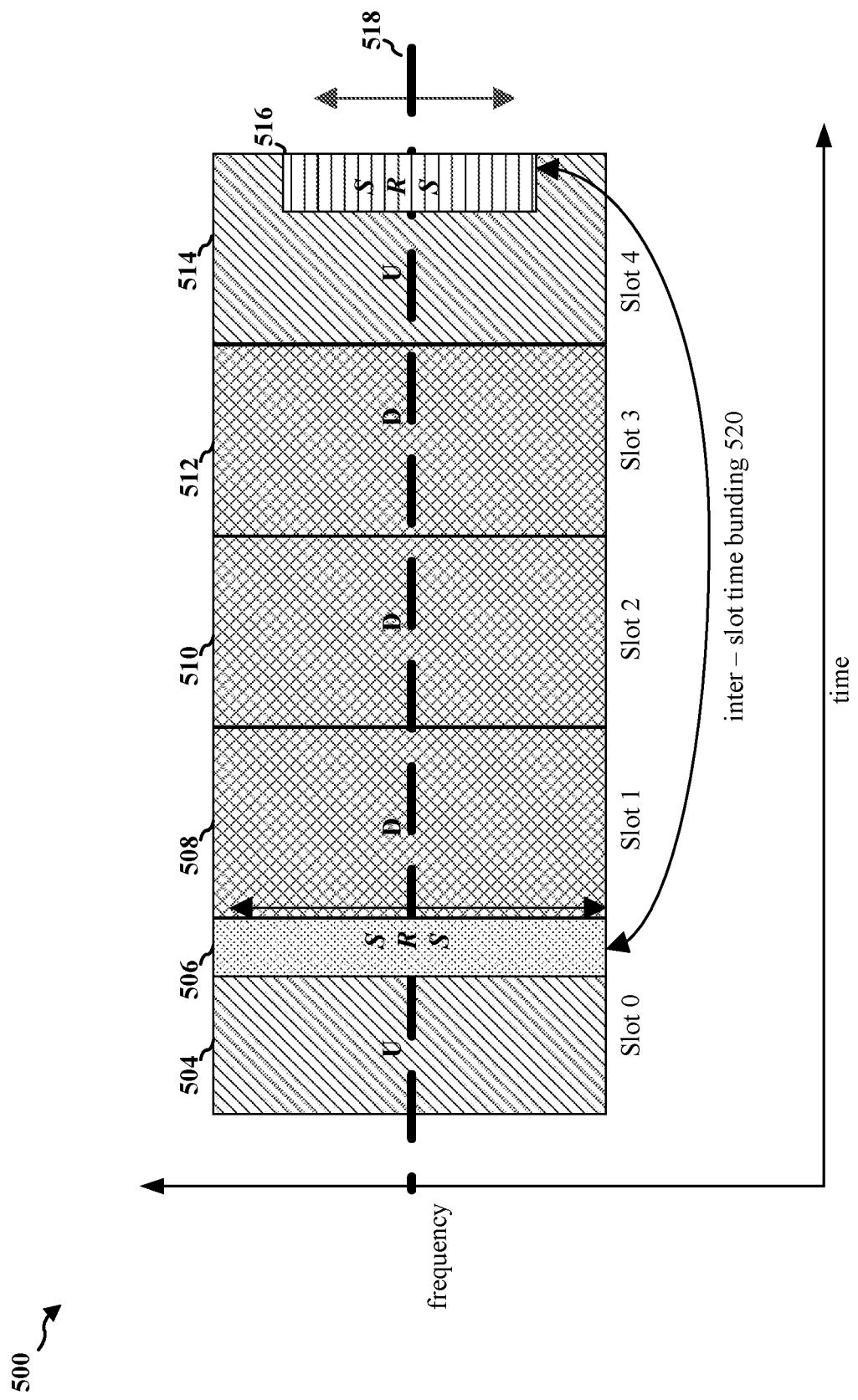
FIG. 5 is a graph of frequency versus time for a plurality of signals being transmitted over corresponding slots between a base station and one or more UEs.

FIG. 5 is a graph 500 of frequency versus time for a plurality of resource blocks being transmitted over corresponding slots 0-4 between a base station and an example UE. The configuration shown in FIG. 5 is an example of inter-slot time-bundling 520 in which the UE may perform an uplink transmission over a physical uplink shared channel at slot 0 (504), at the end of which the UE 506 transmits a previously RRC-configured SRS signal at a wideband (occupying all CCs of that symbol column). Thereupon, at consecutive slots 508, 510, and 512, the gNB may make downlink physical control or data (e.g., shared) channel transmissions to the UE (or in some implementations, to another one or more UEs) in slots 1-3. In this case, during the RRC configuration, the gNB has configured the UE to make two inter-slot transmissions 506 and 520 of the SRS signal every five slots. In slot 4 (514), the UE may initiate an uplink transmission of data to the gNB, at the end of which the UE may transmit a narrow sounding signal in 516 corresponding to the second configured inter-slot transmission. The gNB may receive these two signals (and additional SRS signals that may be time-bundled in other configurations) and combine them coherently to increase cell coverage for uplink transmissions of this UE. Of note is that in the time-bundling configuration of FIG. 5, the wideband signal 506 and narrowband signal 516 share an identical center frequency at 518, thereby enabling the gNB to combine the transmission coherently.

Accordingly in another aspect of the disclosure, SRS time bundling is proposed for one SRS resource (configured in RRC with the UE) that is repeated across two or more time instances/occasions where each transmission covers a different frequency bandwidth, where the two or more transmissions share the same center frequency, where the frequency resource allocations of the two or more SRS transmissions are within a certain threshold specified by the gNB, and where each of the SRS transmissions share the same active bandwidth part, which is unchanging between the different SRS transmissions. Provided that the gNB uses these constraints in concert with either an intra-slot or an inter-slot transmission, the gNB can successfully use the SRS time-bundling of the UE to achieve the superior coverage.

As noted above, when configuring the SRS time-bundling, the gNB can effectively estimate the channel conditions provided it has knowledge of the transmit power of the UE. That is, the transmit power of the UE should be identical at different transmissions across different resource blocks. If the first SRS transmission is a wideband transmission encompassing all the resource blocks at a given symbol, and then the second SRS transmission is a partial sounding transmission, then the gNB can properly determine channel state information provided the transmit power of the gNB is identical and known in both transmissions. Thus the wider bandwidth transmission will be a weaker signal than the partial sounding transmission, and the gNB can draw appropriate conclusions about the channel quality by assessing the difference in the received power. From the point of view of the gNB during the RRC signaling period, the transmit power can most easily be made identical if the gNB specifies in the SRS bundle that the UE use the maximum power. This guarantees that the same transmit power will be used, provided the state of the battery or power source of the UE and/or the transceiver is healthy.

In another configuration, the transmit power can be made the same for different sounding SRS transmissions if the gNB configures the UEs to set the same power control parameters. These power control parameters may include, by way of example, higher layer parameters alpha, p0, pathlossReferenceRS, and srs-PowerControlAdjustmentStates in SRS-ResourceSet.

In still other configurations, the gNB in the SRS time-bundling configuration for the UE can allow the UE to transmit different SRS signals at different powers, provided however, that this difference in transmit power between SRS transmissions falls below a specified threshold, e.g., of X dB. That is, the differences in transmit power must be sufficiently small to ensure that a proper set point can be established for the digital-to-analog converter that converts these signals to analog such that in turn, some minimal equivalent dynamic range can be achieved. With an adequate dynamic range of the converted analog signals, the gNB can recover the time-bundled SRS resource for accurate channel estimations.

Figure 6:
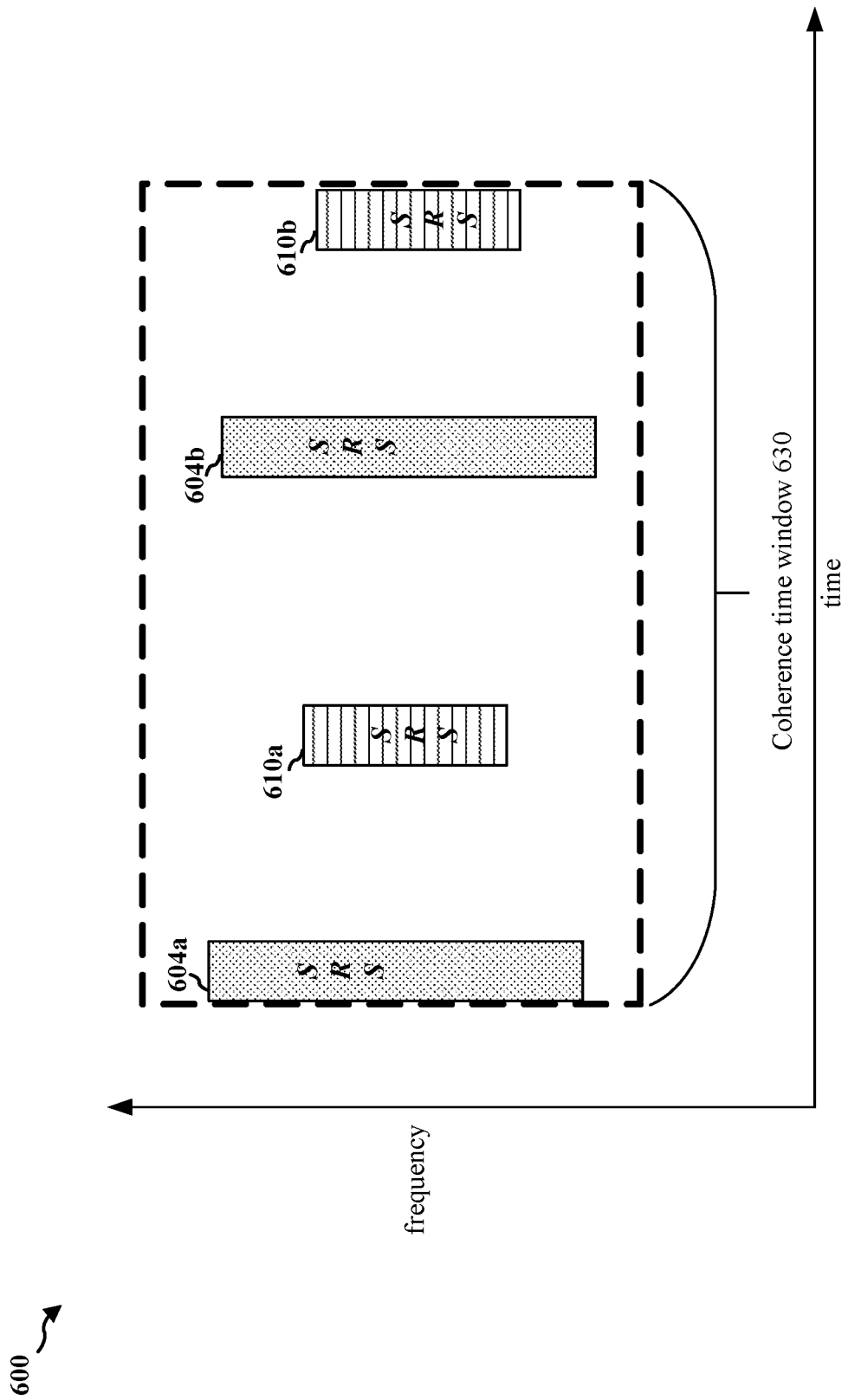
FIG. 6 is a graph of frequency versus time showing a plurality of time-bundled SRS signals from a UE.

While frequency domain and transmit power characteristics and their attendant requirements in STS time-bundling have been discussed, the use of effective SRS-time bundling may also be subject to, and may take into account, a time domain limitation of the UE-specific coherence. FIG. 6 is a graph of frequency versus time showing a plurality of time-bundled SRS signals from a UE. The plurality of wideband 604a and narrowband 604b signals are in a coherence time window 630 specific to the UE. At some initial time, when the UE enters the proximity of the gNB, for example, the UE sends an uplink "UE capability signal" to the gNB to inform the gNB of the UE's coherence time window (e.g., the duration of time in milliseconds, or another time unit, that the phase remains predictable). Thereafter, the gNB may configure the UE's time-bundled SRS transmissions during RRC signaling and it may do so using this value.

In accordance with another aspect of the disclosure, time bundling for one SRS resource may be repeated across two or more time instances or occasions, where the instances have different frequency resource allocations as before (e.g., wideband versus partial sounding), but that are enabled only when the SRS resource can occur within a time window of the UE such that the multiple occasions (narrow band 610a and b and wideband 604a and b) can be time bundled. This is shown in FIG. 6. The length of a coherence time window 630 may vary based on the UE type, and may be approximately 10 or 20 ms in some cases. Ensuring that the repetitions happen within the phase window specified by the UE also ensures that phase coherence can be maintained between the wideband and narrowband signals.

Certain other time domain and physical constraints may be placed on the SRS time-bundling as described herein. For example, each of the SRS signals or instances that make up an SRS resources may have the same time-domain behavior in one aspect in that they are either periodic, semi-persistent, or aperiodic. Semi-persistent SRS signals can be used in short burst of generally periodic data, such as in VoIP or various IoT applications. If each of the SRS signals within the time bundle is aperiodic, however, the signals are triggered by the same DCI codepoint.

In still another aspect of the disclosure, the SRS time-bundled transmissions may be configured to include the same numbered SRS ports between the bundled instances. If the number of ports are different, then only the common ports may be time-bundled, for example. As an illustration, where wideband transmissions in the SRS resource are configured with "2T4R" (meaning with two transmit ports and four antennas that also correspond to receive antennas) and where narrowband transmissions are instead configured with "1T4R" (one port and four antennas), then only the one common port can be use in the SRS time-bundling. The remaining port may then be configured to perform the regular, repetitive SRS transmissions.

In still other aspects of the disclosure, the gNB during configuration only bundles SRS resources that have the same use. Thus, only the shared SRS resource is time bundled. An exception in accordance with this aspect of the disclosure is the "codebook" and "antenna switching functions", both of which may be SRS time-bundled (e.g., one function as a narrowband and the other function as a wideband).

Figure 7:
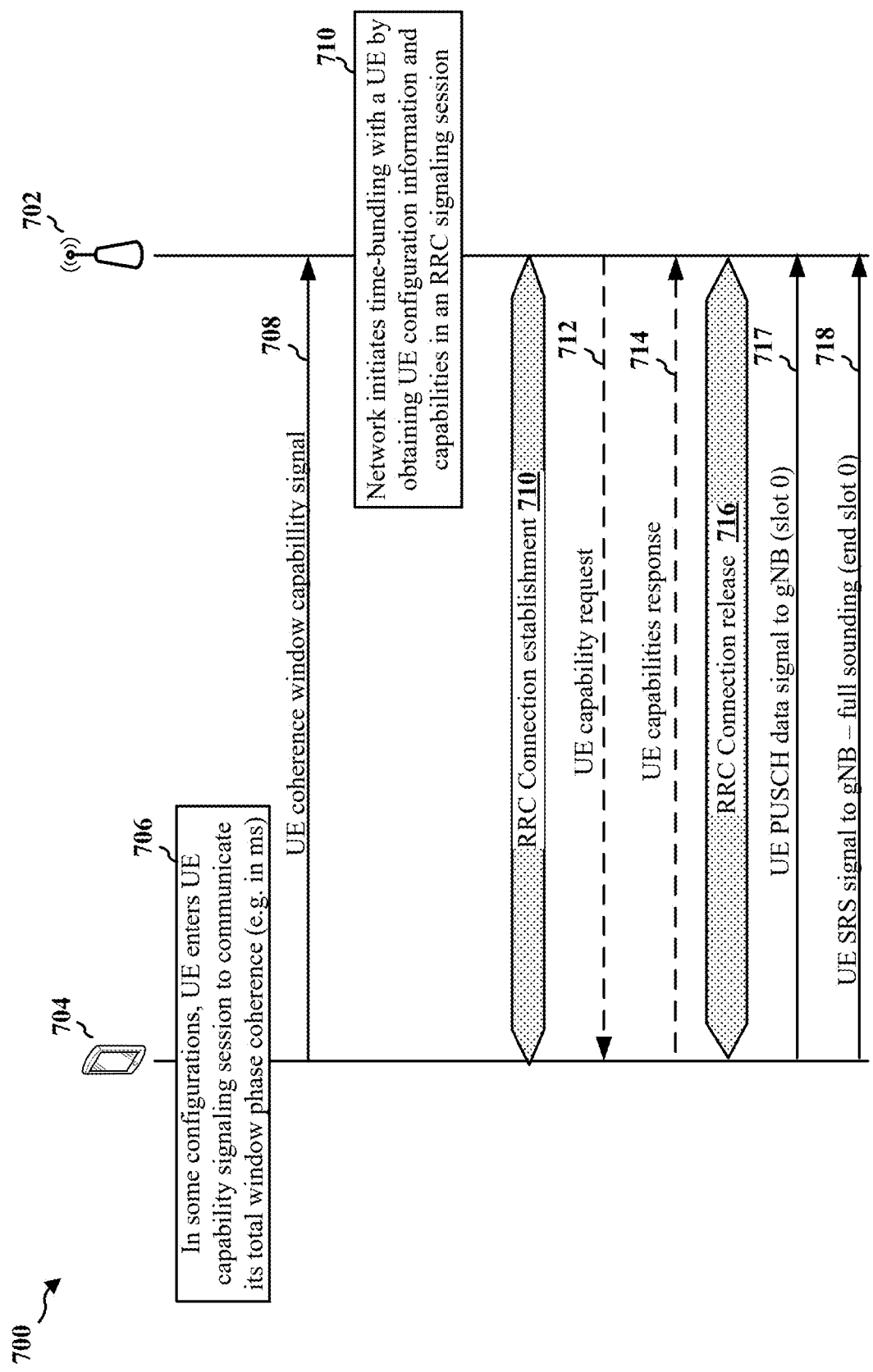
FIG. 7 is a timing diagram of a procedure for configuring and transmitting a plurality of time-bundled SRS signals from a UE.

FIG. 7 is a timing diagram 700 of a procedure for configuring and transmitting a plurality of time-bundled SRS signals from a UE 704. As before, the UE 704 described in timing diagrams 7 and 8, and flowcharts 9 and 10, may be UE 104 from FIG. 1 (e.g., configured with component 198), UE 350 from FIG. 3, or the UE in FIG. 11. The base station 702 functions described in the same figures may be performed by the base station 102/180 (or gNB, etc.) of FIG. 1, along with, in some configurations, component 199, the base station 310 in FIG. 3, or the base station in FIG. 12, for example. As noted in block 706, in certain configurations, the UE may send a UE coherence window capability signal (or words of similar description) as is shown in 708 to the base station 702 to initially inform the base station of the maximum time window of phase coherence of the UE 704. The time window may be expressed to the base station 702 in time units (e.g., ms, etc.) The base station 702 can use this timing information in the ensuing configuration when it begins the process of SRS-bundling resources. For instance, at block 710, the network or base station initiates time bundling for SRS signals with the UE 704 by obtaining the UE coherence information in 708 and thereupon by initiating an RRC signaling session as in 710.

While the base station may configure the UE's SRS time-bundling using different sequences and procedures and still remain within the scope of the disclosure, in the exemplary configuration of FIG. 7, the base station 702 initiates a UE capability request 712 to query the UE about the value of certain parameters that are relevant to SRS time-bundling. The UE 704 may then respond to the base stations capability request in response 714. While only two signals are shown, in practice various amounts or types of data may be exchanged as described above and exemplified in steps 712 and 714. The exchange may occur a variable number of times in some configurations. In other implementations, only a minimum amount of information is needed from the UE. Once the base station 702 has obtained the necessary information from the UE, the base station may thereupon configure the SRS time-bundle and send the configuration in step 714 to the UE 704 which includes the parameters for the UE to use in its SRS time bundling. After the base station 702 passes the configuration to the UE 704, the pair can release the RRC connection in 716.

It should be noted that the base station may concurrently be communicating with a number of UEs and also various devices may have connection through one or more sidelinks. However, the simplified timing diagram in FIG. 7 is used to describe the operations of the base station 702 with the UE 704 in question, while avoiding excess detail that may otherwise obscure the concepts disclosed herein. It is assumed that at some point, the UE may send uplink data to the base station in a first scheduled slot (slot 0, see FIG. 5)) at 717 over a physical uplink shared channel (PUSCH). After the uplink data at the end of the slot, in this example, the UE transmits a wideband SRS signal to the base station (718).

Figure 8:
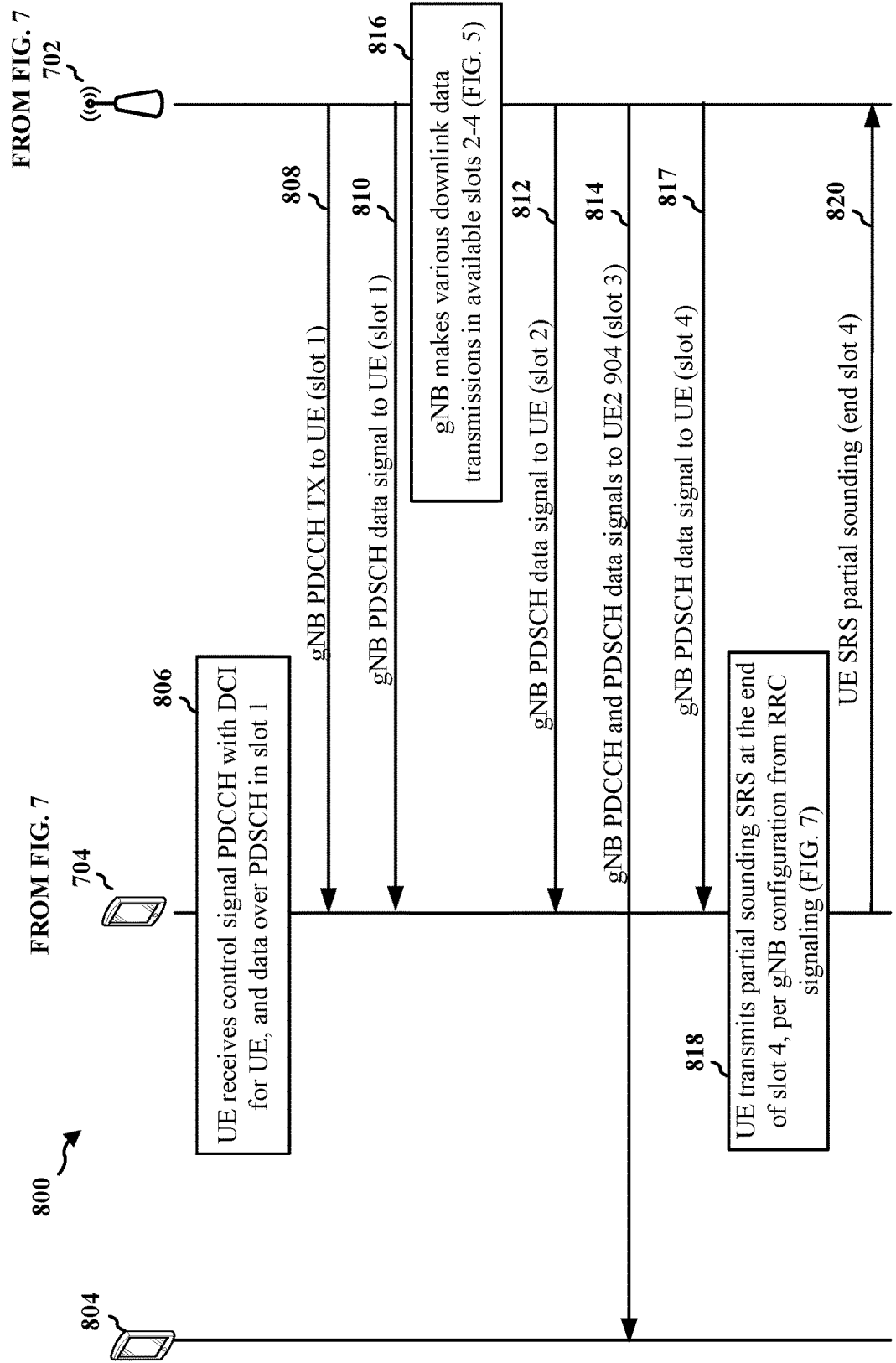
FIG. 8 is a continued timing diagram of the procedure of FIG. 8 for configuring and transmitting a plurality of time-bundled SRS signals from the UE.

FIG. 8 is a continued timing diagram 800 of the procedure of FIG. 8 for configuring and transmitting a plurality of time-bundled SRS signals from the UE. In addition to UE 704 and base station 702 from FIG. 7, another UE 804 is illustrated. Continuing from FIG. 7, and as noted in block 806, the UE receives a control signal from the base station over PDCCH in slot 1 and may receive data over PDSCH in slot 1. Thus, the UE 704 in slot 1 may receive a control signal from the base station transmitted over the physical downlink control channel (PDCCH) (808). Thereafter, UE 704 may receive data over the physical downlink shared channel (PDSCH) in slot 1 (810).

Referring to slots 2-4 of FIG. 8 (see also FIG. 5), the base station may make various downlink transmissions in available slots 2-4. For example, at 812, the base station may send data over PDSCH to UE 704 in slot 2. Then, in slot 3, the base station may send separate control and data signals (respectively over PDCCH and PDSSCH) to another UE 804. In slot 4, the base station may send further data over PDSCH to UE 704 (817). At the end of slot 4, as shown in block 818 and signal 820, the UE may transmit a partial sounding SRS at the end of slot 4 consistent with the base station configuration from the RRC signaling described in FIG. 7. Accordingly, as shown collectively in FIGS. 7-8, UE 704 has performed inter-slot time bundling per its RRC configuration by transmitting a full-sounding pulse at the end of slot 0 and a partial-sounding pulse at the end of slot 4. This inter-slot time-bundling is shown in FIG. 4. It will be appreciated that, although the base station configures the SRS resource as two transmissions, in other cases the base station may configure additional transmissions such that, for example, three SRS signals may be transmitted by the UE over three time slots.

In various implementations, the UE 704 in FIGS. 7 and 8 may be configured to transmit SRS signals that are associated with an identical SRS usage. In other configurations, the transmitted SRS signals may be associated with different codebook or antenna switching SRS usages. As noted previously, the full and partial-sounding SRS transmissions may be configured to have an identical center frequency for preserving the base station's ability to coherently combine the magnitude and phase of the SRS signals. Additionally, in various configurations, the transmit power may be identical in both wide and narrow-band transmissions in respective slots 0 and 4, to enable the base station to accurately assess channel conditions by measuring the receive signal strength, among other parameters.

In various conditions, the UE 704 may be configured to transmit the respective SRS signals 718 (FIG. 7) and 820 (FIG. 8) using different transmit power values. In this case, the base station 702 may specify a threshold power (e.g., in decibels (db)) representing a maximum allowable power difference between the different transmissions of an SRS time-bundled resource. The maximum power difference determined by the base station 704 may be dependent on ensuring that a proper set-point for a digital-to-analog converter is retrieved such that the output analog signal retains an acceptably high dynamic range. It is noted that, while the threshold has been specified here as a power differential threshold, the threshold may be determined or expressed using other means without departing from the spirit and scope of this disclosure.

In various configurations, the UE 704 provides in FIG. 7 the network with a UE coherence window capability signal 708 in which the UE identifies to the network its maximum time window for coherence as a time unit (e.g., in ms). In that case, the time between wide and narrow-band transmissions in slot 0 and slot 4, respectively, does not exceed the UE's time capability as specified in the initial signal 708 (FIG. 7).

In various configurations, a difference in the allocated frequency resource for the wideband signal and the allocated frequency resource for the narrowband signal may be determined not to exceed a threshold frequency specified by the network. This may beneficially help ensure that the phase coherence of the transmissions is retained.

In various configurations, the UE 704 may be constrained to transmit the plurality of SRS signals using an identical bandwidth part (BWP) as specified by the configuration for the SRS signals, and the UE may transmit the SRS signals without any change of the active BWP between time occasions of the SRS transmissions. This configuration of unchanging BWPs helps ensure reliability and coherence of the received signal. In addition, the constraint can enable "legacy" UEs to be allocated with the correct requirements for performing SRS transmissions, because suitable BWPs may be selected by the base station 702 that conform to the requirements of the UE 704 in light of the UE's legacy configuration.

In various configurations, multiple occasions of the time-bundled SRS may occur, provided that the SRS transmissions remain within the coherence time window of the UE 704. As shown in the example of FIG. 6, the base station configures two occasions of the SRS resource (e.g., the first occasion being wideband transmission 604*a* and narrowband transmission 610*a* and the second occasion being wideband transmission 604*b* and narrowband transmission 610*b*). These multiple occasions can be transmitted within the coherence time window of the UE and therefore phase coherence can be maintained.

In various configurations, the SRS resource can be partitioned into multiple resources provided those multiple resource have the same time-domain behavior. For example, the resources may be all periodic, semi-periodic or aperiodic as discussed above. Where the resources are aperiodic, the SRS transmissions of these resources are triggered by the same DCI codepoint.

In various configurations, the base station can configure multiple ports in SRS time bundling. For example, the base station can specify that the SRS resources (e.g., narrow and wide band, for example) use the same number of SRS ports or only common ports. That is to say, the same number of SRS ports are used between the time-bundled resource or, if the number of ports are different, then only the common ports between the occasions can be time-bundled.

In various configurations, multiple SRS resources can be time-bundled if the bae station configures the resources to have the same SRS usage. However, in the case of 'codebook' or 'antenna switching', time-bundling can be configured for these separate SRS usages, provided that only the shared SRS resource is time-bundled.

Figure 9:
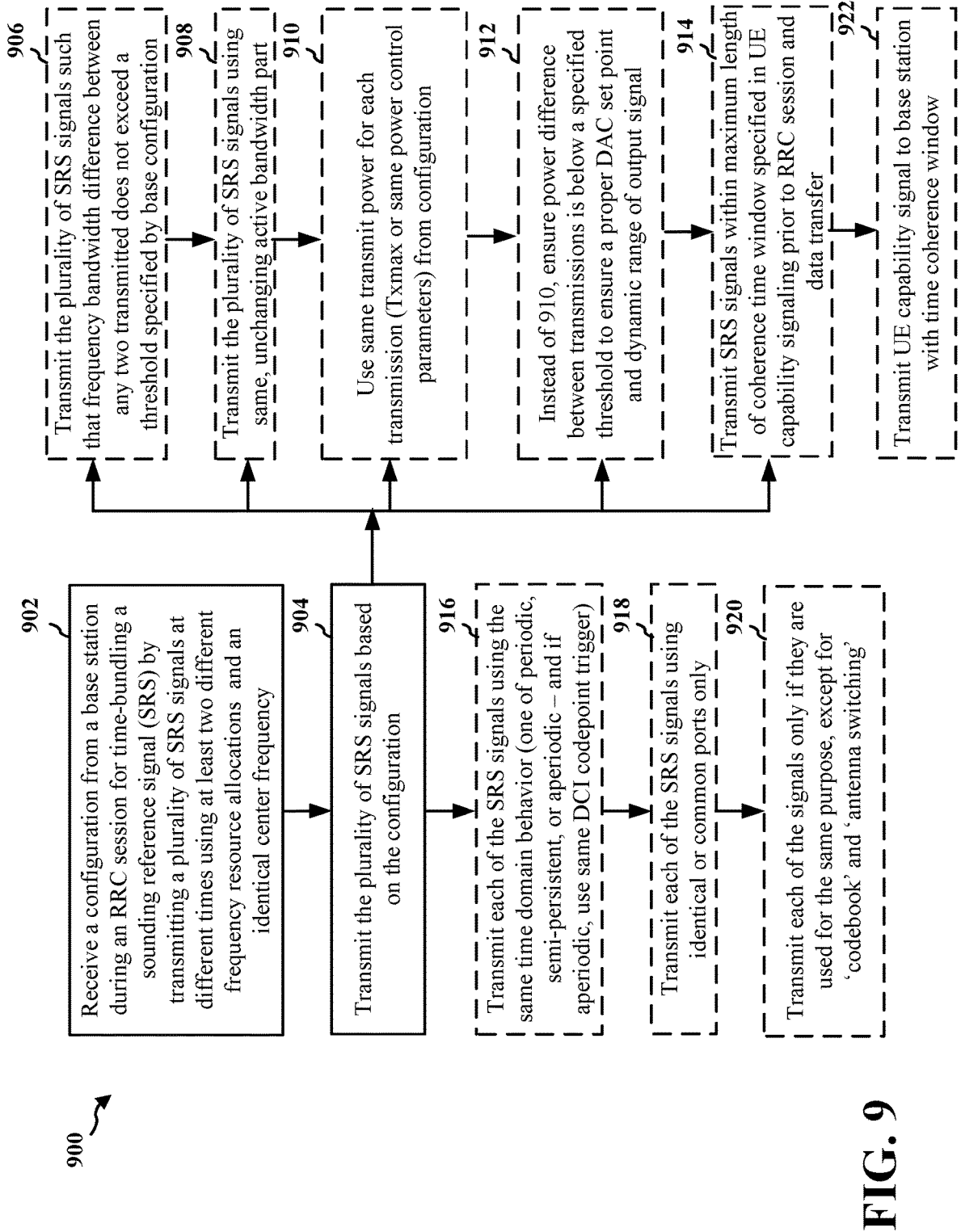
FIG. 9 is a flowchart of a method of wireless communication.

FIG. 9 is a flowchart 900 of a method of wireless communication. The steps performed by FIG. 9 may be performed by the UE 104 in FIG. 1, by the UE 350 in FIG. 3, by the UE 704 in FIGS. 7 and 9, and/or by the UE described further below in FIG. 11. FIGS. 4-6 also show examples of the UE sending SRS time-bundles signals or receiving transmissions, which figures and accompanying descriptions may be relevant to the operation of the base station in the flowchart of FIG. 10. The base station referenced in FIG. 7 may include, for example the base station (gNB, eNB, etc.) 102/180 in FIG. 1, the base station 310 of FIG. 3, the base station (e.g., gNB) 702 in FIGS. 7 and 8, and the base station described further in FIG. 12. The solid outlined-boxes include mandatory steps, while the dashed outlined boxes represent optional implementations that may in some instances be configured with other implementations, whether alone or in concert with still other implementations.

At step 902, the UE may receive a configuration from a base station for time-bundling an SRS signal by transmitting two or more SRS signal using at least two SRS signals at different times using at least two different frequency resource allocations and an identical center frequency. While the configuration may be received during an RRC session, in other implementations the configuration may be received in a different manner (e.g., via a sideband channel or via DCI). In addition, the configuration may be received either in as one or more messages in one RRC session, or it may be received in more than one RRC session.

At step 904, the UE transmits the plurality of SRS signals based on the constraints specified in the configuration provided by the base station. While two transmissions are illustrated herein for clarity, the SRS resource may be partitioned into more than two SRS transmissions in other configurations. The configuration specified by the base station for the UE may include that the different SRS transmissions by the UE have different frequency resource allocations, wherein each of the allocated frequency resources has an identical center frequency (904). The configuration may also specify that each of the UE's transmissions, when compared with any other SRS transmission in the time-bundle, have a frequency bandwidth difference that does not exceed a threshold specified by the base station, as shown in step 906.

As shown in step 908, in another configuration, the UE's SRS signals in the configured time bundle may be transmitted using the same active bandwidth parts, and that there is no change of the bandwidth parts in the period between time-bundled transmissions.

As shown in step 910, in another configuration, the UE may use the identical transmit power for transmitting SRS signals in any of the allocated frequencies. For example, the UE may be set to use a maximum transmission power for each SRS transmission, of that the UE use the power control parameters configured by the base station such that the base station assures transmissions by the UE of an identical power.

As shown in step 912, in other configurations, the UE's transmissions (e.g., over wideband versus narrowband) may have different transmit power levels, provided that the difference in the transmit powers between the different time-bundled signals does not exceed a threshold (e.g., a dB threshold) specified by the base station such that the digital analog converter has a proper set point to produce analog signals having a sufficient dynamic range to perform proper channel estimation.

As shown in step 914, the UE may be configured to transmit instance or occasions of SRS signal (e.g., two groups of SRS signals as shown in FIG. 6) that lie within the UE's own specified maximum time window for guaranteeing that phase coherence can be achieved. As noted above, the UE provides this information in a UE capability signal transmitted to the base station prior to the RRC signaling in which the time-bundling is configured by the network. As shown in step 922, the UE may transmit the above-referenced time window information to the base station prior to the RRC signaling.

As shown in step 916, the UE may transmit each of the different SRS signals using the same time domain behavior, whether the behavior is periodic, semi-persistent, or aperiodic. If the UE is configured to transmit aperiodic SRS signals, the UE's transmission may be triggered by the same DCI codepoint.

As shown in step 918, the UE may transmit each of the SRS signals using either identical port numbers, or alternatively, if the number of ports are different for different SRS resources, the UE can perform the SRS transmissions using common ports.

As shown in step 920, the UE may transmit each of the time-bundled SRS signals that are associated with the same SRS usage. However, for SRS usages that are associated with "codebook" or "antenna-switching", the UE may transmit different SRSs (e.g., having different frequency resource allocations) that correspond to SRS usages for codebook and antenna switching.

Figure 10:
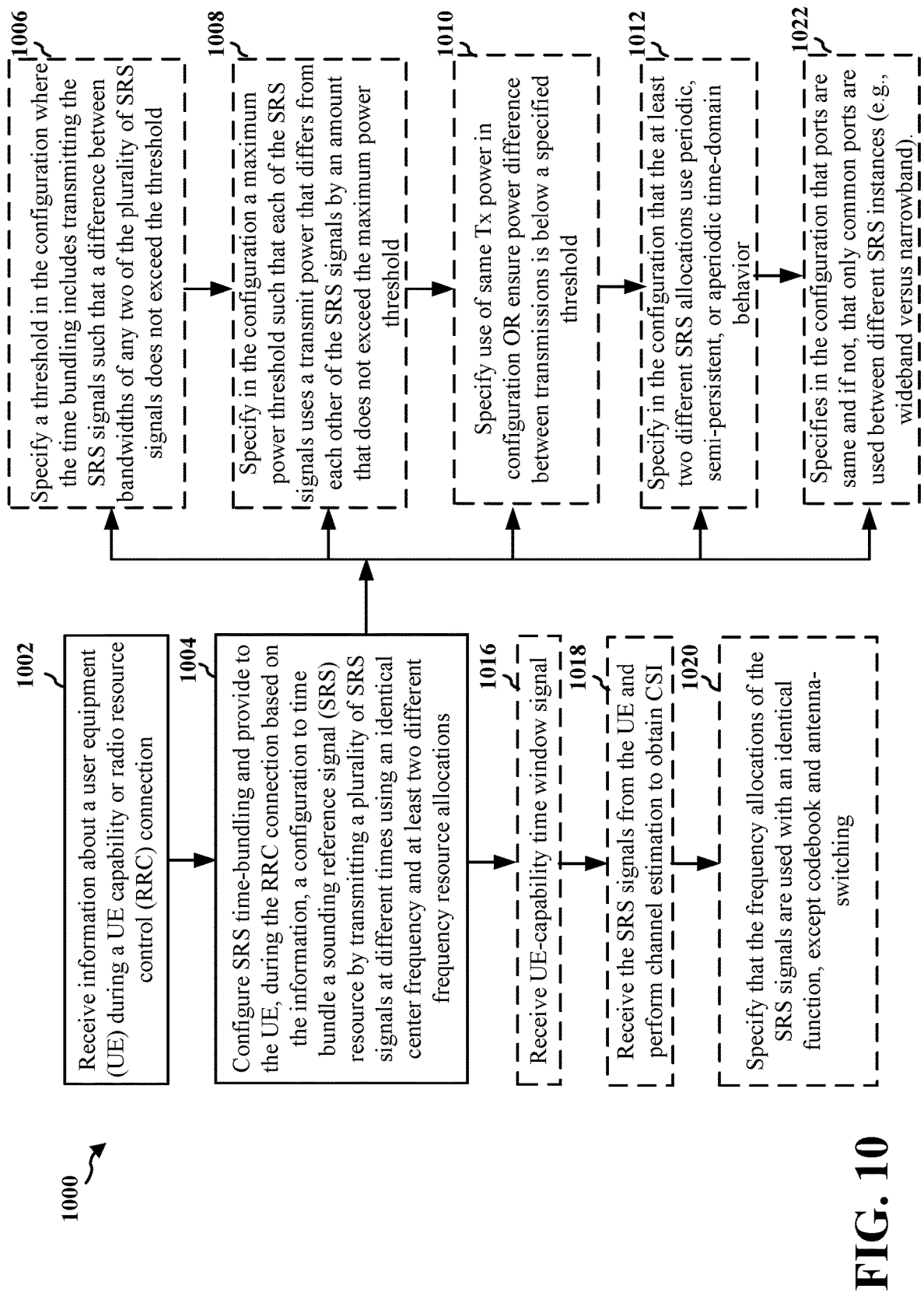
FIG. 10 is a flowchart of a method of wireless communication.

FIG. 10 is a flowchart 1000 of a method of wireless communication. The steps in FIG. 10 may be performed by a base station. The base station may be, for example, the base station 102/180 in FIG. 1, the base station 310 in FIG. 3, the base station 72 in FIGS. 7 and 8, and the base station as described in FIG. 12. FIGS. 4-6 also show examples of the base station sending or receiving transmissions, which figures and accompanying descriptions may be relevant to the operation of the base station in the flowchart of FIG. 10. The base station may, for example, be a gNB, eNB, etc.

At step 1002, the base station receives information about the characteristics and capabilities of the UE during an RRC signaling session established between the devices. Information may include transmit power, number of antennas, and similar UE characteristics. The base station may separately receive from the UE a UE capability signal identifying the time window of the UE's phase coherence, as described by the base station's receipt of a UE-capability time window signal in step 1016 in which the UE provides a time (e.g., in ms) window in which it can maintain phase coherence.

At step 1004, the base station may use the received information to configure the parameters for SRS time-bundling and then transmit to the UE during the RRC connection (or another RRC connection) a configuration for the UE to time-bundle an SRS resource by transmitting two or more SRS signals at different times using an identical center frequency and at least two frequency resource allocations. As noted, the number of frequency resource allocations may be increased over two. Depending on the capabilities of the UE, increasing the partitioned number of SRS transmissions at different frequency bandwidths may increase the integrity of the received channel information. In other configurations, the base station may take the limited capabilities of the UE, or the desire to conserve uplink bandwidth, into account and limit the number of allocated frequency resources to two.

At step 1006, the base station may specify a threshold in the configuration (sent in step 1004) where the time bundling of the UE includes transmitting the SRS signals such that a difference between bandwidths or frequency resource allocations of any two of the plurality of SRS signals does not exceed a threshold. The base station may determine, for example, that an upper limit of frequency difference is need to preserve signal integrity or to successfully obtain CSI parameters.

At step 1008, the base station may specify in the configuration a maximum power threshold such that each of the SRS signals uses a transmit power that differs from any other of the SRS signals in the bundle by an amount that does not exceed this maximum power threshold. This configuration allows the UE to transmit at different powers, but imposes a limit on the difference in order to achieve the dynamic range values at the output of the digital-to-analog converter as described above.

At step 1010, the base station may specify whether the configuration described in step 1008 will be applicable by ensuring that the power differential is within the threshold, or the base station may simply require identical transmission powers, by informing the UE to transmit SRS signals at its maximum power on all SRS transmissions or to transmit an identical power that is defined by power control parameters specified by the base station.

At step 1012, the base station can specify in the configuration which of the time-domain operations the UE uses in the SRS transmissions (periodic, semi-persistent, or aperiodic). As noted above, different SRS transmissions in the same bundle use the same time-domain operation. The base station may also specify here the DCI codepoint to be used for triggering an SRS if the time-domain behavior is aperiodic.

At step 1020, the base station can specify in the configuration the type of function with which the SRS-usage is to be associated. The function is to be identical for SRS time-bundled transmissions, except that common SRS-usage may be associated with codebook and antenna switching functions.

At step 1022, the base station can specify in the configuration which port numbers are to be used by the different resources. Generally the same numbered SRS ports are used between the bundled resource. Otherwise, the base station can specify which common ports between SRS instances or occasions are used. If the port numbers are different between the wideband and narrowband SRS instances, for example, then the disparate ports may be configured with separate SRS resources to perform repetitive SRS transmissions.

At step 1018, the base station receives the SRS signals from the UE and performs channel estimation, timing coordination, etc. to receive the CSI. By virtue of the time-bundling, the base station may be able to increase coverage with this UE (and other UEs, if applicable, in which time bundling may be employed), which improves network performance.

Figure 11:
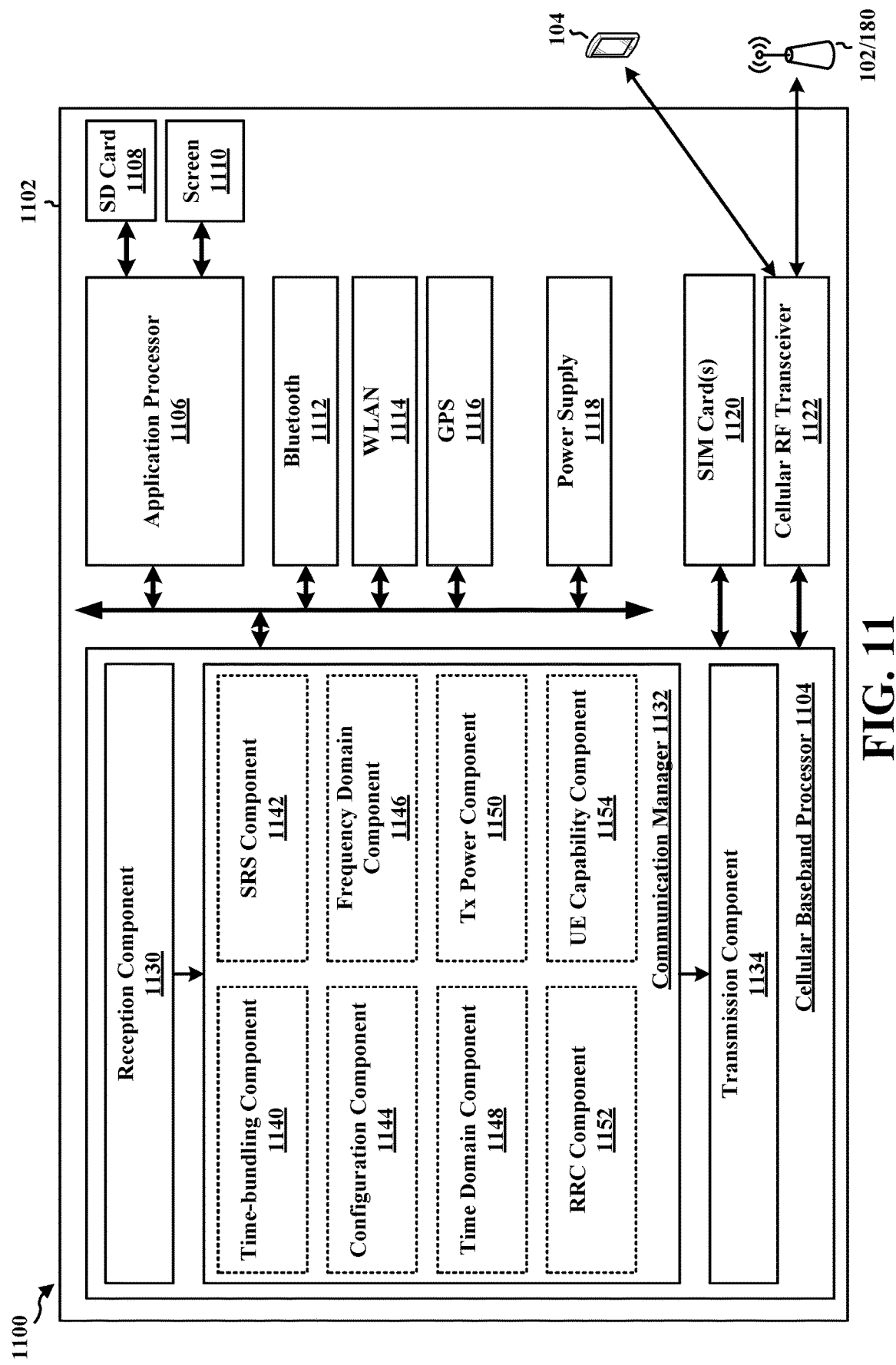
FIG. 11 is a diagram illustrating an example of a hardware implementation for an example apparatus.

FIG. 11 is a diagram 1100 illustrating an example of a hardware implementation for an apparatus 1102. The apparatus 1102 is a UE and includes a cellular baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the aforediscussed additional modules of the apparatus 1102.

The communication manager 1132 includes a time-bundling component 1140 that is configured to perform the various tasks to enable the transmission component to transmit time-bundled sequences of signals at specified times, e.g., as described in connection with steps 904, 906, 908, 910, 912, 914, 916, 918 and 920 of FIG. 9. The communication manager 1132 further includes an SRS component 1142 that receives input in the form of time-bundling information from the component 1140 and is configured to implement SRS protocols in the time-bundled signals, e.g., as described in connection with the same transmit steps 904, 906, 908, 910, 912, 914, 916, 918 and 920 of FIG. 9. The communication manager 1132 further includes a configuration component 1144 that receives input in the form of the SRS time-bundling configuration from base station via the reception component 1130 as described in connection with step 902 of FIG. 9. The configuration component 1144 may also receive time-bundling information from the component 1140 and the SRS configuration from the component 1142, and is configured to organize this configuration information and distribute relevant specifications to different components in the communication manager 1132.

The communication manager 1132 further includes a frequency domain component 1146 that receives information from the configuration component 1144 and the time-bundling component 1140 and is configured to assist the SRS component 1142 in performing frequency-domain related tasks to configure the SRS data, e.g., as shown in 902, 904 and 906 of FIG. 9. The communication manager 1132 further includes a time domain component 1148 that receives information from the configuration component 1144 and that is configured to assist the SRS component 1142 and the time-bundling component in providing time-domain information to the SRS signal, as shown in 914, 916 and 920 in FIG. 9. The communication manager 1132 further includes a Tx power component 1150 that receives information from the configuration component 1144 and that is configured to regulate a value of the transmitted power of the SRS signal output from the transceiver 1122, e.g., as shown in 910 and 912 of FIG. 9. The communication manager 1132 further includes an RRC component 1152 that is configured to enter into RRC sessions with the base station for initiating an SRS configuration at the base station, e.g., as shown in 902 of FIG. 9. The communication manager 1132 further includes a UE capability component 1154 and is configured to assist in providing UE capability information prior to the RRC session, such as the time window of phase coherence of the UE, e.g., as shown in 922 of FIG. 9.

The apparatus may include additional components that perform each of the blocks of the algorithm in the aforementioned timing diagrams of FIGS. 7 and 8 and the flowchart of FIG. 9. As such, each block in the timing diagrams of FIGS. 7 and 8 and the flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes (1) means for receiving a configuration from a base station for time-bundling an SRS resource by transmitting a plurality of SRS signals at different times using an identical center frequency and at least two different frequency resource allocations, and (2) means for transmitting the plurality of SRS signals based on the configuration. The aforementioned means may be one or more of the aforementioned components of the apparatus 1102 configured to perform the functions recited by the aforementioned means. As described supra, the apparatus 1102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
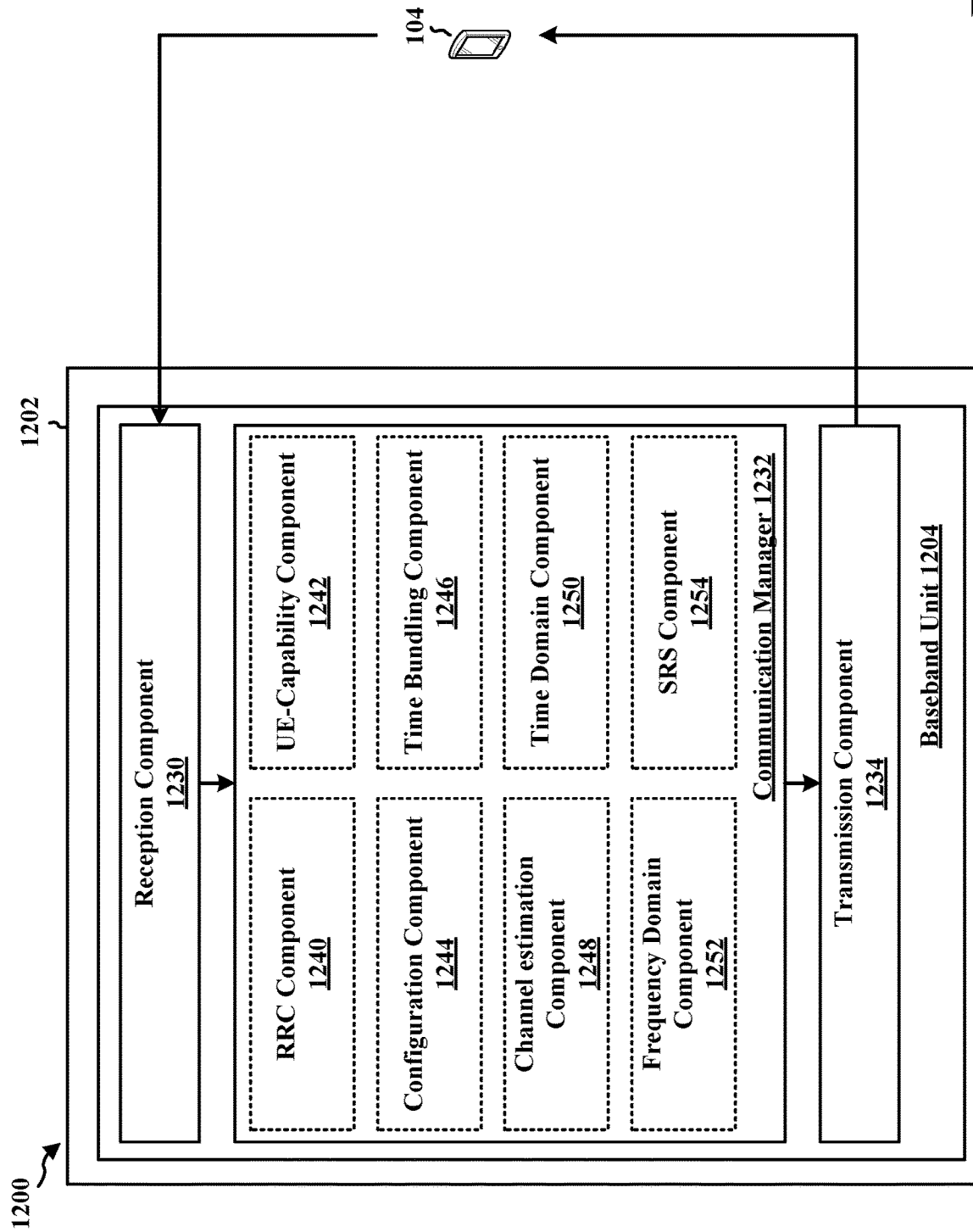
FIG. 12 is a diagram illustrating an example of a hardware implementation for an example apparatus.

FIG. 12 is a diagram 1200 illustrating an example of a hardware implementation for an apparatus 1202. The apparatus 1202 is a BS and includes a baseband unit 1204. The baseband unit 1204 may communicate through a cellular RF transceiver with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the BS 310 and may include the memory 376 and/or at least one of the TX processor 316, the RX processor 370, and the controller/processor 375.

The communication manager 1232 includes an RRC component 1240 that is configured to enter into an RRC connection with a UE, exchange signaling information, configure an allocation for SRS time-bundling and provide the configuration to the UE, e.g., as described in connection with step 1004 of FIG. 10. The communication manager 1232 further includes a UE-capability component 1242 that receives a time window value representing a maximum phase coherence from the UE via reception component 130 and provides the information to configuration component 1244 to incorporate into the configuration, e.g., as described in connection with 1002, 1004, and 1016 of FIG. 10. The communication manager 1232 further includes a configuration component 1244 that receives input from components 1240 and 1242 in the form of SRS-time bundling information and UE capability information and that prepares a configuration for SRS time bundling, e.g., as described in connection with 1002 and 1004 of FIG. 10.

Communication manager 1232 further includes a time-bundling component 1246 that receives configuration information from component 1244 and that configures time-bundling information in concert with component 1242, e.g., as described in connection with 1002 and 1004 of FIG. 10. Communication manager 1232 further includes a channel estimation component 1248 that receives input in the form of SRS transmissions from reception component 1230 and that prepares channel state information for subsequent communication with the UE, e.g. as shown in 1018 of FIG. 10. Communication manager 1232 further includes a time domain component 1250 that receives input in the form of time-domain information from configuration component 1244 and time bundling component 1246 and that determines time-domain based behavior for the SRS configuration, e.g., as shown in 1012 and 1016 of FIG. 10. Communication manager 1232 further includes a frequency-domain component 1252 that receives input in the form of frequency-based parameters from configuration component 1244 and that is configured to perform different frequency domain allocations and to develop frequency-based constraints for the configuration, e.g., as shown in 1004, 1006 and 1020 of FIG. 10.

The apparatus may include additional components that perform each of the blocks of the algorithm in the aforementioned timing diagrams of FIGS. 7 and 8 and flowchart of FIG. 10. As such, each block in the aforementioned timing diagrams of FIGS. 7 and 8 and flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the baseband unit 1204, includes (1) means for receiving information about a user equipment (UE) during a UE capability or radio resource control (RRC) connection, (2)

means for providing to the UE, during the RRC connection based on the information, a configuration to time bundle a sounding reference signal (SRS) resource by transmitting a plurality of SRS signals using an identical center frequency and at least two different frequency resource allocations at different respective times, and (3) means for estimating an uplink channel quality based on the SRS signals. The aforementioned means may be one or more of the aforementioned components of the apparatus 1202 configured to perform the functions recited by the aforementioned means. As described supra, the apparatus 1202 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for wireless communication at a user equipment (UE), comprising:
   receiving a configuration from a base station for time-bundling a sounding reference signal (SRS) resource, the configuration for time-bundling comprising transmitting a plurality of SRS signals at different times using an identical center frequency and at least two different frequency resource allocations; and
   transmitting the plurality of SRS signals based on the configuration.

2. The method of claim 1, further comprising transmitting the plurality of SRS signals such that a difference between bandwidths of any two of the plurality of SRS signals does not exceed a threshold specified in the configuration.

3. The method of claim 2, further comprising transmitting the plurality of SRS signals using an identical bandwidth part (BWP) specified in the configuration for the SRS signals without any change of the active BWP between time occasions of the SRS transmissions.

4. The method of claim 1, wherein the time-bundling comprises one of intra-slot time bundling or inter-slot time bundling.

5. The method of claim 1, further comprising transmitting each of the SRS signals at a maximum transmit power or at an identical power determined by power control parameters identified in the configuration.

6. The method of claim 1, further comprising transmitting each of the SRS signals using a transmit power that differs from each of the other SRS signals by an amount no greater than a specified power threshold.

7. The method of claim 6, wherein the specified power is configured to produce, for each of the transmissions, a digital-to-analog converter (DAC) output signal having a minimum specified dynamic range.

8. The method of claim 1, further comprising reporting by the UE to the base station a capability of a phase-coherence time window in a time unit; and
   transmitting the plurality of SRS signals within the time window that is within the time window reported by the UE.

9. The method of claim 1, further comprising transmitting the plurality of SRS signals such that the at least two different frequency resource allocations use only one of periodic, semi-persistent, or aperiodic time-domain behavior.

10. The method of claim 9, wherein transmitting the plurality of SRS signals using aperiodic time-domain behavior comprises using as a trigger a common downlink control information (DCI) codepoint.

11. The method of claim 9, wherein transmitting the plurality of SRS signals comprises using identical or common ports for the at least two different frequency resource allocations.

12. The method of claim 11, wherein except for codebook and antenna-switching SRS usages, the at least two different frequency resource allocations of the plurality of SRS signals are associated with an identical SRS usage.

13. A method of wireless communication at a base station, comprising:
   receiving information about a user equipment (UE) during a UE capability or radio resource control (RRC) connection; and sending to the UE, during the RRC connection based on the information, a configuration for time bundling a sounding reference signal (SRS) resource, the configuration for time-bundling comprising transmitting a plurality of SRS signals using an identical center frequency and at least two different frequency resource allocations at different respective times.

14. The method of claim 13, further comprising specifying a threshold in the configuration,
wherein the time bundling further comprises transmitting the plurality of SRS signals such that a difference between bandwidths of any two of the plurality of SRS signals does not exceed the threshold.

15. The method of claim 13, wherein the configuration further specifies an identical bandwidth part for use with the SRS signals.

16. The method of claim 13, wherein the time-bundling comprises one of intra-slot time bundling or inter-slot time bundling.

17. The method of claim 13, wherein the configuration further specifies using a maximum transmit power or power control parameters for transmission.

18. The method of claim 13, further comprising specifying in the configuration a maximum power threshold such that each of the SRS signals uses a transmit power that differs from each other of the SRS signals by an amount that does not exceed the maximum power threshold.

19. The method of claim 13, further comprising receiving a maximum phase-coherence time window from the UE,
wherein the configuration further specifies that transmitting the plurality of SRS signals is within the received time window.

20. A user equipment (UE), comprising:
a memory; and
at least one processor coupled to the memory and configured to:
receive a configuration from a base station for time-bundling a sounding reference signal (SRS) resource, the configuration for time-bundling comprising transmitting a plurality of SRS signals at different times using an identical center frequency and at least two different frequency resource allocations; and
transmit the plurality of SRS signals based on the configuration.

21. The UE of claim 20, wherein the at least one processor is further configured to transmit the plurality of SRS signals such that a difference between bandwidths of any two of the plurality of SRS signals does not exceed a threshold specified by the configuration.

22. The UE of claim 21, wherein the at least one processor is configured to transmit the plurality of SRS signals using an identical bandwidth part (BWP) specified by the configuration for the SRS signals without any change of the active BWP between the time occasions of SRS transmission.

23. The UE of claim 20, wherein the time-bundling comprises one of intra-slot time bundling or inter-slot time bundling.

24. The UE of claim 20, wherein the at least one processor is further configured to transmit each of the SRS signals at a maximum transmit power or at an identical transmit power determined by power control parameters identified in the configuration.

25. The UE of claim 20, wherein the at least one processor is further configured to transmit each of the SRS signals using a transmit power that differs from each of the other SRS signals by an amount no greater than a specified power threshold.

26. The UE of claim 25, wherein the specified power comprises a value configured to produce, for each of the transmissions, a digital-to-analog converter (DAC) output signal having at least a minimum specified dynamic range.

27. The UE of claim 20, wherein the at least one processor is further configured to report by the UE to the base station a capability of a phase-coherence time window in a time unit, and to transmit the plurality of SRS signals within the time window that is within the time window reported by the UE.

28. A base station, comprising:
a memory; and
at least one processor coupled to the memory and configured to:
receive information about a user equipment (UE) during a UE capability or radio resource control (RRC) connection; and
provide to the UE, during the RRC connection based on the information, a configuration for time bundling a sounding reference signal (SRS) resource, the configuration for time bundling comprising transmitting a plurality of SRS signals at different times using an identical center frequency and at least two different frequency resource allocations.

29. The base station of claim 28, wherein the at least one processor is further configured to specify a threshold in the configuration,
wherein the time bundling further comprises transmitting the plurality of SRS signals such that a difference between bandwidths of any two of the plurality of SRS signals does not exceed the threshold.

30. The base station of claim 28, wherein the at least one processor is further configured to receive a maximum phase-coherence time window from the UE,
wherein the configuration further specifies that transmitting the plurality of SRS signals is within the received time window.

* * * * *